United States Patent [19]

Van Der Stok et al.

[11] Patent Number: 5,837,638
[45] Date of Patent: Nov. 17, 1998

[54] ZEOLITE COMPOSITION

[75] Inventors: Huibert Van Der Stok, Rotterdam; Nasir Javid, AH Bilthoven, both of Netherlands

[73] Assignee: NV Holding Company Belgie, Belgium

[21] Appl. No.: 560,112

[22] Filed: Nov. 17, 1995

[30] Foreign Application Priority Data

Jul. 13, 1995 [NL] Netherlands .......................... 1000794

[51] Int. Cl.[6] .................................................. B01J 29/04
[52] U.S. Cl. .............................. 502/62; 502/60; 435/262; 435/264; 435/267
[58] Field of Search ....................... 502/62, 60; 435/262, 435/264, 267

[56] References Cited

U.S. PATENT DOCUMENTS

| | | | |
|---|---|---|---|
| 4,715,958 | 12/1987 | Fuchs | 210/605 |
| 5,250,483 | 10/1993 | Sperl et al. | 502/7 |
| 5,286,385 | 2/1994 | Jorgensen et al. | 210/610 |
| 5,541,096 | 7/1996 | Nomura et al. | 435/176 |

FOREIGN PATENT DOCUMENTS

| | | |
|---|---|---|
| WO8900547 | 1/1989 | WIPO . |
| WO9117123 | 11/1991 | WIPO . |

*Primary Examiner*—Michael L. Lewis
*Assistant Examiner*—Thomas G. Dunn, Jr.
*Attorney, Agent, or Firm*—Bachman & LaPointe, P.C.

[57] ABSTRACT

The present invention relates to a zeolite composition comprising a culture of denitrificating bacteria and a process for the preparation of said zeolite composition. The zeolite composition further comprises potassium carbonate and sodium hydrogen sulphate. The zeolite composition is very useful for controlling the biological conditions in waters, in particular for controlling the growth of algae.

9 Claims, No Drawings

ZEOLITE COMPOSITION

BACKGROUND OF THE INVENTION

The present invention related to a zeolite composition. The present invention further relates to a process for preparing a zeolite composition and the use thereof for controlling the biological conditions in waters.

According to this invention the term waters is intended to comprise basins or pools for growing fish and plants, e.g. ponds, aquaria, basins for hydroculture, and swimming pools. The basins for growing fish and plants may be large growing trays or basins which are commonly used for the commercial cultivation of fish and plants, but also domestic ponds. The swimming pools may be large swimming pools, e.g. those which are commonly used for international swimming competition or which are found in recreation parks, or smaller domestic swimming pools. Waters also comprise natural ponds and lakes, in particular smaller basins, e.g. puddles, pools and meres. Also comprised by waters according to this invention are basins which are used in agriculture and horticulture, in particular in hydroculture, wash apparatus used for washing cars and trains and other industrial applications, e.g. car washes, and waterworks for domestic, agricultural, horticultural and industrial use. Such systems in particular suffer from excessive growth of algae which causes not only an increased flow resistance, but may eventually also lead to blockages of lines, filters and pumps.

The water contained by ponds and swimming pools suffers from pollution by e.g. environmentally unfriendly chemicals present in the atmosphere, e.g. sulphur and nitrogen oxides, or chemicals carried by the wind or rain, e.g. sand and salts. These pollutants or contaminants may also comprise natural organisms and microorganisms such as algae, spores, sporules, viruses and pathogenic bacteria.

Chemicals present in the atmosphere may fall into the waters because they are soluble therein or because they react with water forming water soluble compounds. Algae, in particular algae spores, may fall into the waters by the action of wind and/or rain. In swimming pools pathogenic bacteria may for example be transferred from infected users to the swimming water.

Contaminants and pollutants generally affect the "health" of the water, i.e. they often give rise to a disturbance of the biological and chemical balance. When acid forming chemical substances contained by the atmosphere are dissolved in water or when they react with water forming water soluble compounds, the chemical balance of the water will be disturbed leading to such an increase of the pH that the environment for fish and plants becomes far from optimal which may eventually lead to the death of these organisms. Also not unlikely is the increase of the hardness of the water by inorganic compounds such as salts dissolved therein.

A disturbance of the biological balance may for example be caused by excessive growth of algae which leads to discoloration and turbidity of the water, bad smells and non-observable growth of algae on the bottom and sides of e.g. swimming pools. The latter in particular may affect the safety of the user because of slippery surfaces. Organic material originating from the algae may also result in blockage of lines, filters and pumps. More important is, however, that such organic material is a very good substrate for bacteria. in particular for pathogenic bacteria.

For maintaining the water of swimming pools in good condition care has to be taken for the pH-balance, alkalinity and hardness of the water as otherwise the chlorine-containing disinfectants are nut effective. Undesired spore-elements such as iron, manganese or copper originating from the water which is used for filling up the swimming pool of from corroded materials or articles present in the swimming pool or parts thereof may further discolour the water.

Filtration of water contained by ponds and swimming pools is often necessary to remove solid contaminants. These solid contaminants may comprise sand particles, agglomerates of organic materials, in particular nitrogen containing materials, and remains of tissue of organisms such as bacteria or algae. Organic materials in particular have to be removed as they are an extremely suitable substrate for pathogenic bacteria.

Furthermore a good circulation of the water in ponds is required for e.g. an optimal oxygen supply, an effective filtration of solid contaminants and a good distribution of chemical substances, e.g. those chemicals which are being used to maintain the water in good condition.

For disinfecting the water in swimming pools chlorine containing chemicals are often used, e.g. sodium and calcium hypochlorite and chloroisocyanurates. Because of their aggressive nature, such compounds are not suitable to apply to waters which are the life-environment of plants and fish. As these compounds buffer the water at a basic pH, acid has to be added to the water to maintain an approximately neutral pH.

Other well-known disinfecting substances for swimming pools may also be used although they have the disadvantage of being incapable of oxidizing or decomposing organic materials or that their activity is dependent from the presence of co-chemicals.

Well-known chemicals for controlling the growth of algae in swimming pools are for example quarternairy ammonium compounds. These chemicals are usually absorbed on filter material. Hence, for an effective activity high dosage levels of the quarternairy ammonium compounds or a regular exchange of the filter materials are required.

The pH of the water in swimming pools is simply controlled with cheap chemicals such as hydrochloric acid. However, the use of hydrochloric acid is not suitable for controlling the pH of water in ponds.

The alkalinity of water in swimming pools is expressed by the concentration of carbonate ions. Because of the buffering capacity of carbonates the pH of is subjected to change to a lesser extent.

The hardness of water is predominantly determined by the concentration of magnesium and calcium ions. The hardness of water is controlled by the addition of magnesium or calcium containing compounds or by the addition of water. As zeolites are known to have ion-exchanging capabilities they are also used for controlling the hardness of water. However, the zeolite materials do not control the other important factors such as pH, alkalinity and growth of algae.

Form above it appears that many widely different chemical substances have to be used for maintaining the biological and chemical balance in water, in particular of water used in swimming pools. Moreover, because of their poisonous or unhealthy nature or because of their incompatibility with each other many of these chemical substances are not suitable for controlling the quality of the water which is used for growing fish and plants.

OBJECTS OF THE INVENTION

It is an object of the present invention to provide a composition for maintaining the biological and chemical balance in waters.

It is another object of the present invention to provide a composition for maintaining the biological and chemical balance in waters, wherein said composition can replace the combination of the various chemicals mentioned above.

A further object of the present invention is to provide a composition which is not only capable to control the pH of the water but also the alkalinity and the hardness thereof.

A still further object of the present invention is to provide a composition which is capable to decompose organic substances, in particular nitrogen containing chemical substances, to unharmful substances and to control the growth of algae.

Still another object of the present invention is to provide a composition which is capable to control the concentration of nitrogen containing chemical compounds.

SUMMARY OF THE INVENTION

For achieving the objects mentioned above there is provided a zeolite composition, wherein said composition comprises a culture of denitrificating bacteria.

As part of the present invention there is also provided a process for the preparation of a zeolite composition comprising a culture of denitrificating bacteria.

Another part of the present invention is the use of a zeolite composition comprising a culture or denitrificating bacteria for controlling the biological conditions in waters.

DETAILED DESCRIPTION OF THE INVENTION

The present invention provides a zeolite composition, wherein said composition comprises a culture of denitrificating bacteria.

Most zeolites, in particular zeolites of natural origin, are strongly basic. When such a zeolite is brought into contact with water the alkaline-earth and alkaline metal ions present therein will exchange with other cations which are present in the water. By this process hydroxides of these alkaline-earth and alkaline metal ions are formed resulting in an increase of the pH, e.g. to a pH of approximately more than 8.5. As such basic conditions are generally harmful to plants and fish and are generally not suitable for the growth of bacteria, the pH of the zeolite is preferably controlled to a more neutral value, i.e. pH of approximately 6 to approximately 7. Thus, it is advantageous that the composition according to the invention contains a weak acid.

Further, to regulate the alkalinity of the water the concentration of carbonate ions has to be controlled. According to the present invention it is advantageous that the composition contains carbonate ions as the concentration of carbonate ions in water is often quite low. An optimal concentration of carbonate ions is further beneficial for plant life as plants convert carbonate, optionally in the form of carbon dioxide, to oxygen by way of photosynthesis and to other useful organic compounds by way of other processes, said organic compounds are necessary for the growth or plants. Another important chemical for plant growth is potassium. Therefore, according to the invention the zeolite composition contains preferably potassium ions, carbonate ions and a weak acid. More preferably, the zeolite composition according to the present invention contains potassium carbonate as well as sodium hydrogen sulphate.

The amounts of the components of the composition according to the present invention is essential for obtaining an optimal and well-balanced activity of these components. Preferably, the composition according to the present invention contains of from about 50% wt. to about 75% wt. of zeolite, about 5% wt. to about 5% wt. of $K_2CO_3$, about 15% wt. to about 35% wt. of $NaHSO_4$ and about 5% wt. to about 20% wt. of a culture of denitrificating bacteria. More preferably, the composition according to the present invention contains of from about 60% wt. to about 70% wt. of zeolite, about 2% wt. to about 4% wt. of $K_2CO_3$, about 20% wt. to about 30 % wt. of $NaHSO_4$ and about 10% wt. to about 15% wt. of a culture of denitrificating bacteria.

According to the present invention it is preferred that the bacteria comprised by the composition according to the present invention are capable to decompose organic carbon and nitrogen compounds, e.g. amino acids, carbohydrates, carbonic acids and salts thereof and inorganic nitrogen compounds, e.g. ammonium, nitrite and nitrate salts. It is also preferred that the bacteria are active in the presence of oxygen, although the composition according to the present invention may contain bacteria which are able to grow under anaerobic conditions, e.g. in the sludge located on the bottom of a pond. The bacteria comprised by the composition according to the invention are preferably nitrificating and/or denitrificating bacteria. More preferably the bacteria are denitrificating bacteria selected from the group of aerobic chemoheterothrophic bacteria, in particular of the group consisting of Rhizobium and Azobacter.

The zeolite comprised by the composition according to the present invention is preferably selected from the group of natural zeolites, e.g. chabazite, mordenite, erionite, faujasite and clinoptilolite. The zeolite is in particular clinoptilolite.

The present invention also relates to a process for the preparation of the zeolite composition according to the present, invention as described above. The process comprises essentially three steps, wherein a) a zeolite is impregnated with an aqueous solution of potassium carbonate, b) the product obtained in step a) is impregnated with an aqueous solution of sodium hydrogen sulphate, and c) the product obtained in step b) is impregnated with a culture of denitrificating bacteria.

The sequence of the steps a) on b) is essential as zeolite possesses a greater capability to exchange potassium ions. As described here before it is preferred that the composition according to the present invention contains potassium ions as potassium ions are necessary for plant growth. Moreover, it is preferred that a zeolite is used having an average particle diameter of about 0.1 to about 5 mm, in particular or about 1 to about 3 mm.

It is further possible to prepare the composition according to the present invention by using solid potassium carbonate and solid sodium hydrogen sulphate. This is especially advantageous when the composition is prepared at a larger scale. It is therefore preferable that solid potassium carbonate and solid sodium hydrogen sulphate are used.

The composition according to the present invention is very suitable for maintaining the biological balance and the related chemical balance in waters, in particular in waters in which organism such as fish and plants are present, e.g. ponds and aquaria.

By using the composition according to the present invention it is not necessary to use other chemical substances as described here before. The composition according to the present invention controls the pH of the water and maintains an optimal balance of the bacteria population and counteracts the growth of algae. As the composition contains exchangeable ions which do not contribute to the hardness of the water, e.g. potassium and sodium ions, the composition according to the present invention controls the hardness of the water by exchanging potassium ions and sodium ions against ions responsible for a too great hardness of the water, e.g. calcium ions and magnesium ions. Another advantage of the composition according to the invention is that the composition is capable to control an optimal concentration of organic carbon and nitrogen compounds and inorganic nitrogen compounds in the water. Moreover, the composition according to the invention is capable to give off substances as carbon dioxide and potassium ions to the water which substances are beneficial for plant growth. The composition according to the invention may also be used in waters in which the biological and chemical balance is disturbed. The composition according to the invention has therefore a restoring activity and is capable of making the water of ponds etc. "healthy" again. The invention relates therefore also to the use of the composition for controlling the biological conditions in waters.

The composition according to the present invention is in particular useful for controlling an excessive growth of algae in waters, as by the use thereof an optimal concentration of inorganic and organic substances is maintained. As described above the composition according to the invention may also be used in strongly polluted waters, in waters wherein the biological and the related chemical balance is disturbed of in waters wherein an excessive growth of algae has occurred. The composition according to the invention may also be used to prevent an excessive growth of algae. However, the composition according to the invention is preferably used for controlling algae.

The composition according to the present invention can be used as such. In that case it is preferred that about 100 g to about 1000 g of the composition is used per $m^3$ water, in particular about 300 g to about 600 g per $m^3$ water.

The advantages and the excellent activity of the composition according to the present invention will be illustrated by the following example.

EXAMPLE 1

A preferred embodiment of the composition of the present invention contained 60% wt. clinoptilolite, 24% wt. $NaHSO_4$, 2.5% wt. $K_2CO_3$ and 13.5% wt. granules of Rhizobium bacteria.

For a field trial a pond located in Slough, United Kingdom, was used having a kidney-like shape, wherein the maximum length was about 175 cm and the maximum width was about 83 cm. The depth varied between about 30 cm and 60 cm. The pond contained about 818 l of water. The pond has 7 to 8 water lilies floating in it and some ordinary tall green rushes and some tall variegated rushes of approximately 80–100 cm height. There are goldfish of which 4 could be observed at any time when they are near the surface. The pond was cleaned properly only two weeks ago and the algae have re-appeared with a vengeance in just that short time. The pond is extremely muddy and full of algae.

On day 1 (sunny with changes and fairly cool) about 100 g of the composition was sprinkled over the water. The physical conditions of the pond was inspected at least once a day and the weather conditions were registered.

On day 2 (mild weather, drizzle) another 100 g of the composition was sprinkled over the pond and on day 3 (sunny) another 100 g.

Already on day 4 (cooler than on day 3) the upper part of the water is less turbid.

On day 6 (changeable) tire pond is definitely clearer as at least 12 to 14 fish can be observed at any time.

On day 9 (sunny but cool for the time of the year) the pond is very clear. The depths of clear water were measured and it appeared that at the left en front end of the pond the water was crystal clear to a depth of about 15 cm and at the right en rear end about at a depth of about 35 cm. The fish as well as the rushes can be observed to a depth of about 20 cm.

On day 11 (changeable, drizzle) the filter and the pump were cleaned. The material present therein smelled awful (like a vase full of flowers which have been standing for up to 14 days in the same water).

On day 18 another 100 g of the composition was added as a recalculation revealed that the volume of the pond was closer to about 1000 l l.

On day 20 (changeable) the fish appeared to be observable up to the bottom of the pond. An amount of 45 l of rain water was added to the pond.

On day 21 the filter and the pump were cleaned once more. The material present therein was odourless. The water of the pond was crystal clear and the plants looked very healthy and thriving compared to day 1. At the same time 20 fish could be observed.

We claim:

1. A zeolite composition comprising a culture of denitrificating bacteria, potassium ions, carbonate ions and a weak acid.

2. A zeolite composition according to claim 1, wherein the composition further comprises potassium carbonate and sodium hydrogen sulphate.

3. A zeolite composition according to claim 1, wherein the composition contains of from about 50% wt. to about 75% wt. of zeolite, about 0.5% wt. to about 5% wt. of $K_2CO_3$, about 15% wt. to about 35% wt. of $NaHSO_4$ and about 5% wt. to about 20% wt. of a culture of denitrificating bacteria.

4. A zeolite composition according to claim 3, wherein the composition contains of from about 60% wt. to about 70% wt. of zeolite, about 2% wt. to about 4% wt. of $K_2CO_3$, about 20% wt. to about 30% wt. or $NaHSO_4$ and about 10% wt. to about 15% wt. of a culture of denitrificating bacteria.

5. A zeolite composition according to claim 1, wherein the culture of denitrificating bacteria is selected from the group of aerobic chemoheterotrophic bacteria.

6. A zeolite composition according claim 5, wherein the culture of denitrificating bacteria is selected from the group consisting of Rhyzobium and Azobacter.

7. A zeolite composition according to claim 1, wherein the zeolite is selected from the group of natural zeolites.

8. A zeolite composition according to claim 7, wherein the zeolite is selected from the group consisting or chabazite, mordenite, erionite, faujasite and clinoptilolite.

9. A zeolite composition according to claim 8, wherein the zeolite is clinoptilolite.

* * * * *